(12) United States Patent
Ruegg et al.

(10) Patent No.: US 8,330,971 B2
(45) Date of Patent: Dec. 11, 2012

(54) ADVANCED COVER-DRIVEN WORKFLOW FOR A PRINTSHOP

(75) Inventors: Alexandra D Ruegg, La Crescenta, CA (US); Kenneth Wang, La Palma, CA (US); John P Parsons, Manhattan Beach, CA (US); Daniel Vega, West Covina, CA (US); Louis Sinn, La Verne, CA (US); Richard T Horn, Claremont, CA (US)

(73) Assignee: Xerox Corporation, Norwwalk, CT (US)

( * ) Notice: Subject to any disclaimer, the term of this patent is extended or adjusted under 35 U.S.C. 154(b) by 516 days.

(21) Appl. No.: 12/413,791

(22) Filed: Mar. 30, 2009

(65) Prior Publication Data

US 2010/0214622 A1 Aug. 26, 2010

Related U.S. Application Data

(60) Provisional application No. 61/155,537, filed on Feb. 26, 2009.

(51) Int. Cl.
*G06F 3/12* (2006.01)

(52) U.S. Cl. ...................................... 358/1.13

(58) Field of Classification Search .................. None
See application file for complete search history.

(56) References Cited

U.S. PATENT DOCUMENTS

| 5,991,516 | A | 11/1999 | Desmond et al. |
|---|---|---|---|
| 6,206,358 | B1 * | 3/2001 | Yamaguchi et al. ........ 270/52.02 |
| 7,145,670 | B2 * | 12/2006 | Keane et al. .................. 358/1.13 |
| 7,413,175 | B2 | 8/2008 | Levine et al. |
| 7,518,746 | B2 * | 4/2009 | Leiman et al. ............... 358/1.15 |
| 7,677,855 | B2 * | 3/2010 | Parker et al. ...................... 412/6 |
| 2006/0028662 | A1 | 2/2006 | Dobrovolsky |
| 2006/0225570 | A1 * | 10/2006 | Levine et al. ................... 95/109 |
| 2006/0257232 | A1 | 11/2006 | Sullivan et al. |

* cited by examiner

*Primary Examiner* — Marivelisse Santiago Cordero
*Assistant Examiner* — John Wallace
(74) *Attorney, Agent, or Firm* — MH2 Technology Law Group LLP

(57) ABSTRACT

A method and apparatus of printing books based on digital data, comprises accepting a plurality of orders, each order including a request for at least one copy of each of a plurality of titles. The plurality of orders form a streamlined cover set. The streamlined cover set is scanned, the detecting of each cover in the cover set causing digital printing of a book block corresponding to the detected title associated with the cover.

6 Claims, 3 Drawing Sheets

ADVANCED COVER-DRIVEN WORKFLOW FOR A PRINTSHOP

CROSS REFERENCE TO RELATED APPLICATION

This application claims priority from U.S. Provisional Application No. 61/155,537, filed Feb. 26, 2009.

INCORPORATION BY REFERENCE

U.S. Pat. No. 7,413,175, assigned to the assignee hereof, is hereby incorporated by reference in its entirety for the teachings therein.

TECHNICAL FIELD

The present disclosure relates to workflow systems for use in printshops, in particular, where printed covers are attached to printed book blocks to form books.

BACKGROUND

U.S. Pat. No. 7,413,175, assigned to the assignee hereof, describes what can be generally called a "cover-driven workflow" for use in book manufacturing. In brief, in a large printshop environment, and especially an environment where books are printed on demand from digital data, book blocks (the set of printed pages) for any number of various titles have been matched to the covers of their respective titles. (As used herein, "title" shall refer to the instance of a book that a customer expects, e.g. "War and Peace" or "Gone with the Wind"—there may be made any number of copies of a given title.) Of course, any book block associated with a different title than the cover it is attached to is worthless, and must be avoided.

With cover-driven workflow, a certain number of unattached covers for a title are obtained corresponding to the number of copies desired for the title, and the covers themselves are digitally scanned and recognized as corresponding to the given title. The recognizing of each cover acts as a "trigger" to cause the image data for the corresponding title to be used to print a single book block, which is subsequently attached to the scanned cover. Because the cover itself of a title is used as a type of "job ticket" for causing printing of the book block for that title, cover-driven workflow can ensure that a cover is always attached to its correct book block.

US Patent Application Publications 2006/0028662 and 2006/0257232 teach comparable concepts in book manufacturing. U.S. Pat. No. 5,991,516 relates to reorganizing a digital print job to lessen a need to reconfigure the printing equipment.

SUMMARY

According to one aspect, there is provided a method of printing books based on digital data, comprising accepting a plurality of orders, each order including a request for at least one copy of each of a plurality of titles. The plurality of orders is streamlined, and a set of covers form a streamlined cover set corresponding to the combined order is created. The streamlined cover set is scanned, the scanning of each cover in the cover set including detecting a title associated with the cover and causing digital printing of a book block corresponding to the detected title associated with the cover.

According to another aspect, there is provided an apparatus useful in book manufacture, comprising a scanner for scanning a cover set, the scanner including means for detecting a title associated with each cover in the cover set. Means are provided for causing digital printing of a book block corresponding to the detected title associated with each cover. A ramp directs each scanned cover toward an accumulator for attachment to the book block. Means are provided for comparing a title associated with a cover with a title associated with the book block received in the accumulator.

DETAILED DESCRIPTION

Figure 1:
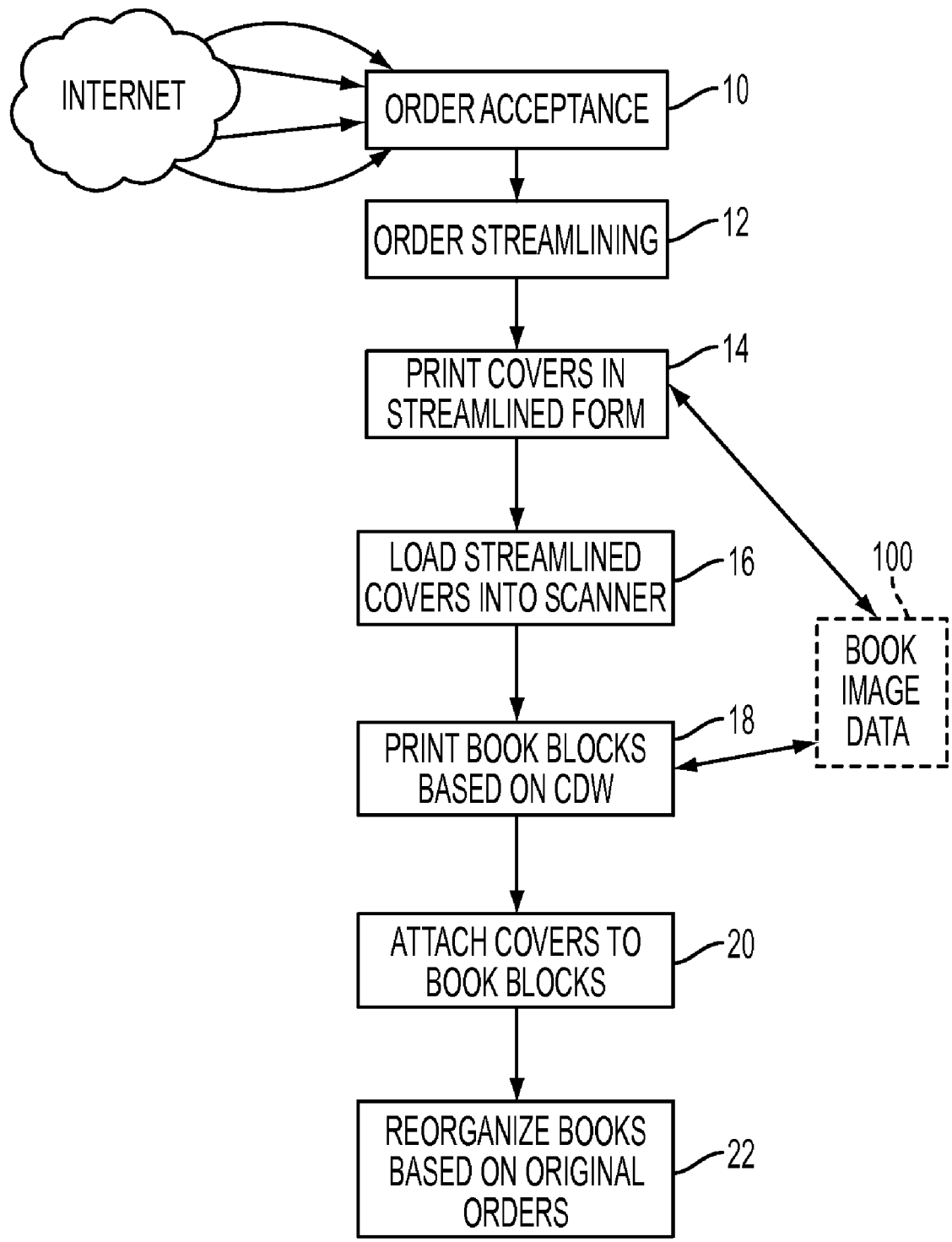
FIG. 1 is a simple flowchart of an advanced cover-driven workflow, in the context of a print-on-demand book manufacturing facility.

FIG. 1 is a simple diagram of an advanced cover-driven workflow, in the context of a print-on-demand book manufacturing facility that accepts orders on a full-time, ongoing basis, such as over the internet. As shown at step 10, orders for different numbers of copies of various titles may come in at any time, either from individual readers or from bookshops. To take an example, a printshop is capable of printing four titles, called A, B, C, D; in a real-world situation, of course, it is more likely a printshop would have image data for thousands of available titles it may be called upon to manufacture. In this example, in a typical hour, four customers C1, C2, C3, C4 contact the printshop, through the internet or otherwise, and make the following orders:

C1: A A A B C D
C2: B B B B B B
C3: D
C4: A B C C C C C C D D D D

In a practical situation, it is often the case that different titles may have radically different requirements for printing, particularly in terms of page size and desired paper quality (pulp, acid-free, glossy, etc.). To cause manufacture of each of the above customer orders simply in the order they were received would likely entail inefficiency-causing complications in the operation of digital printers, such us requiring a human worker to reconfigure the various equipment multiple times, such as to load different types of paper as needed every time a new title is demanded.

It would be more efficient if the set of orders could be combined to minimize or lessen the instances where the title is changed and the equipment must be reconfigured, such as by combining the four orders and grouping the combined order by title:

C(1234): A A A A B B B B B B B B C C C C C C D D D D D D

As used herein, the above combining of orders can be called an example of "streamlining" the plurality of orders, as shown as step 12. More broadly, streamlining can be defined as reorganizing an order of printing titles within a combined set of orders. This streamlining can be performed by a computer, using algorithms which operate, for example, within fixed time horizons (e.g., compiling received orders at 6 AM every day, and then generating a streamlined schedule based thereon for the rest of the day), or within a moving time window (e.g., scheduling the next three hours of activity based on orders received in the previous three hours). These algorithms must take into account the fact that large orders may require more time than is available within a given time horizon or window.

The output of the streamlining step 12 is obtaining (typically, but not necessarily, on-demand printing based on digital data) of a set of covers corresponding exactly to the streamlined plurality of orders, as shown at step 14. If the covers are printed on demand based on stored digital data, the streamlined plurality of orders can be organized as a print job referring to a pre-existing collection of book image data (including both cover and book-block data) retained in a repository 100. In a practical implementation, repository 100 may effectively comprise any number of sources of book image data, such as remote digital repositories owned or controlled by publishing companies or other copyright holders, etc. The streamlined cover set should include one cover corresponding to each book in the streamlined order, in a sheet order of titles corresponding to the streamlined order. The covers, which may be of different size and printed on different stocks, may be printed on different digital printers and collated, or the covers could be all printed the same size, with one digital printing machine, with the expectation the covers will be trimmed as needed later in the manufacturing process.

The covers forming the streamlined cover set are then loaded into a scanner, as shown at step 16, to initiate the cover-driven workflow (CDW) process as generally described in the patent incorporated by reference above. The covers are digitally scanned and recognized as corresponding to a given title. The result of scanning and thus recognizing each cover acts as a "trigger" to cause the book-block image data for a given title to be retrieved from repository 100 and sent to a digital printer within the printshop to print a copy of the book-block for the title, as shown by step 18. If multiple copies of a particular title are desired within a combined or streamlined order, the image data for the book block need only be retrieved and raster image processed ("ripped") once, and then the digital printer would be controlled to print one copy for each instance of a cover recognized by the scanner. In a practical implementation, the scanning need be only of a sufficient quality to allow recognition of the title associated with a cover, and may be in the form of simple bar-code reading.

One practical advantage of streamlining a set of orders is, as noted above, to lessen or minimize, over outputting a set of orders, the instances where the title is changed and the equipment must be reconfigured, such as to change paper size or stock. Further, in software sense, streamlining may have the effect of lessening the required resources to perform raster image processing ("ripping") for a given title, because image data for a given title would likely need be "ripped" only once for printing the required number of copies for the streamlined job. Also, if image data for a given title must be obtained from an external copyright holder, streamlining is likely to lessen the number of necessary interactions with the copyright holder, such as e-mails or electronic orders, for printing the required number of copies for the streamlined job.

After the book blocks are printed, they are attached to their corresponding covers, as at step 20, and the books resulting from the streamlined job can be packed for delivery according to the original orders, as at step 22. A streamlining algorithm, as described above, may take into account a predetermined manageable combined job size (e.g., in terms of total number of printed books or cartons to be filled) that is likely to avoid human error in reorganizing the printed books by original order.

Figure 2:
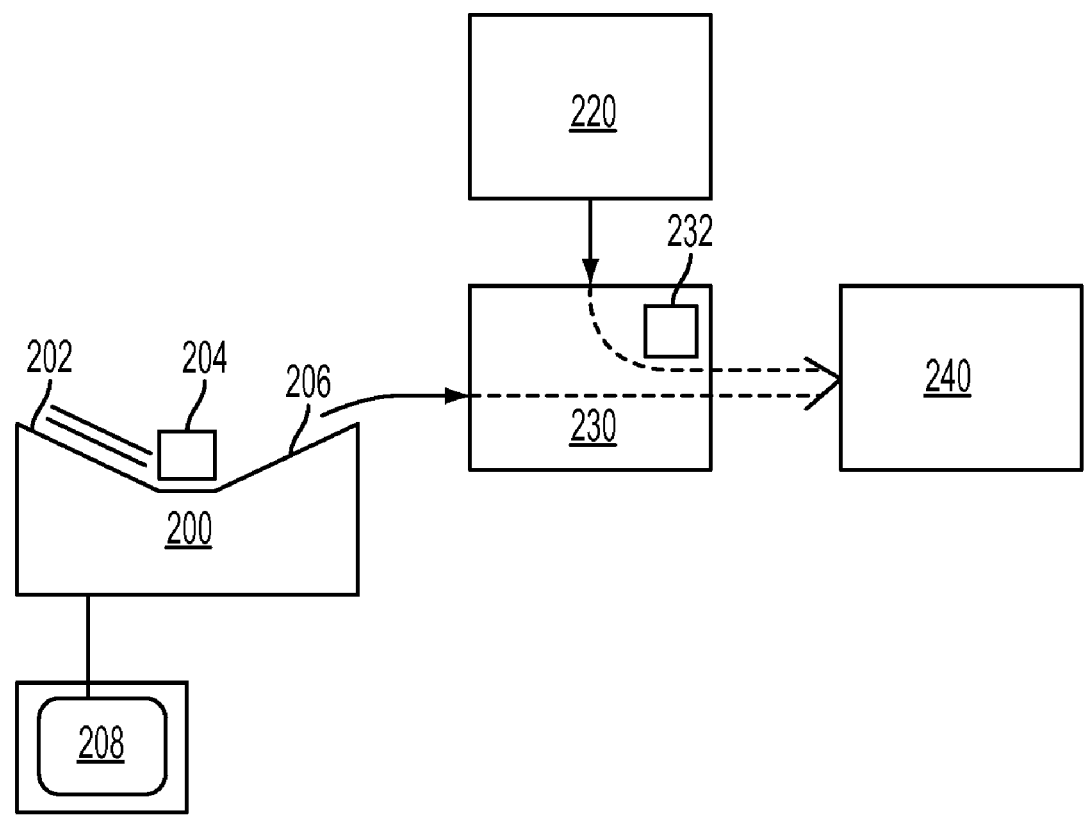
FIG. 2 is a simplified diagram of an apparatus for carrying out a cover-driven workflow.
Figure 3:
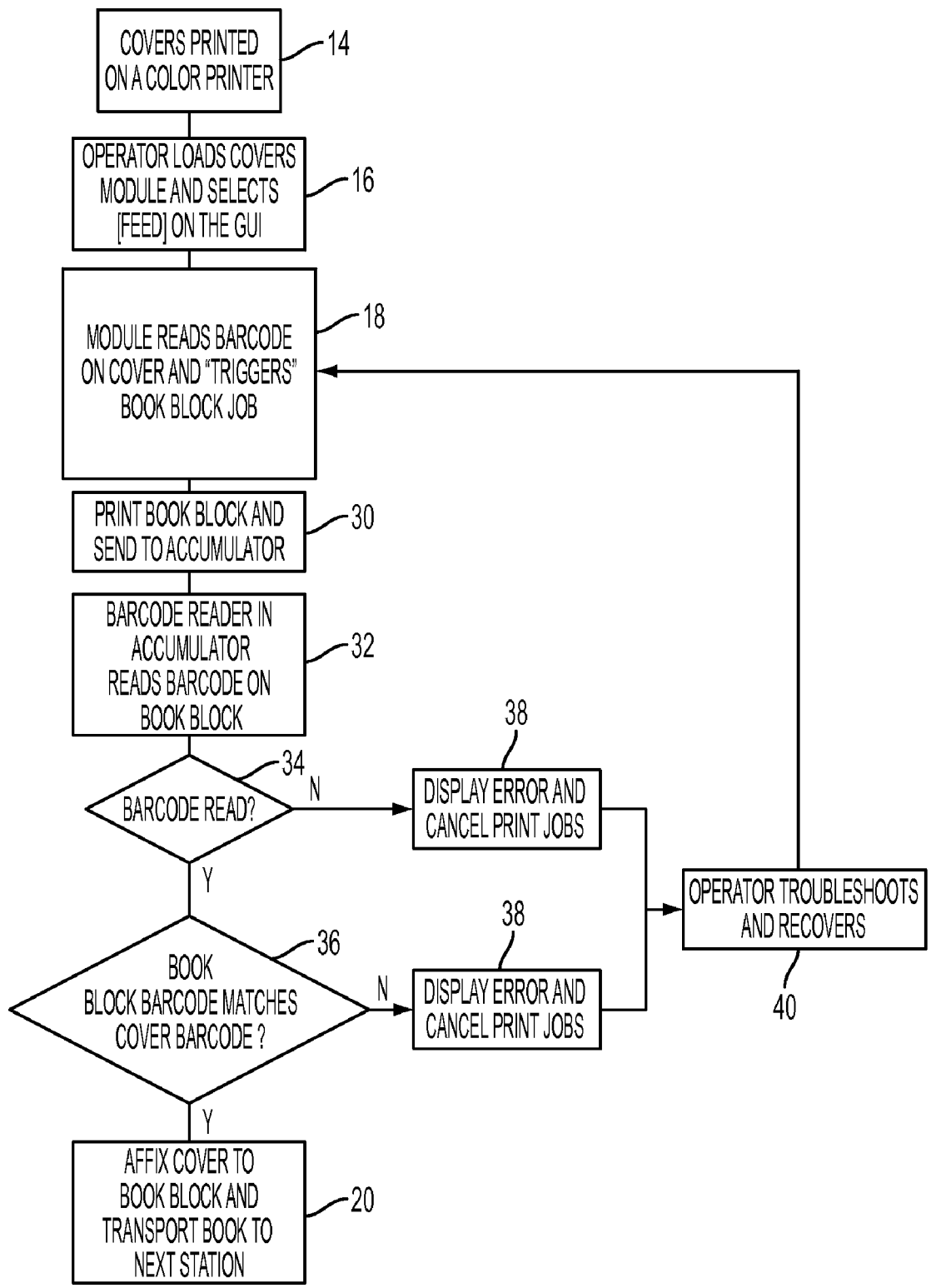
FIG. 3 is detailed flowchart showing operation of the apparatus of FIG. 2.

FIG. 2 is a simplified diagram of an apparatus for carrying out a cover-driven workflow, while FIG. 3 is a flowchart showing the operation of the apparatus. (FIG. 3 is a more detailed version of portions of the method shown in FIG. 1; in the diagrams, like numbers indicate like steps.) In this embodiment, there is provided a scanning module generally indicated as 200; a digital printer 220; and what can be called an "accumulator" 230, which typically is formed as part of a book binder 240. As described above, the scanning module 200 accepts, in a feeder tray 202, a stack of covers corresponding exactly to the streamlined plurality of orders (step 16 in FIG. 3). The scanning hardware, indicated as 204, scans each of the loaded covers (step 18); scanning module 200 needs only enough optical acuity to allow recognition of the title associated with a cover, and may be in the form of simple bar-code reading. Downstream of scanning hardware 204 is a ramp 206, by which each cover can be conveyed to finishing equipment for attachment to a book block. In this embodiment, the module 200 further includes a user interface 208, along with associated electronics (not shown) for supporting the user interface and interacting with other devices, as will be described below.

Also shown is a digital printer generally indicated as 220, which outputs a book block based on a signal from the scanning module, as described above, using the digital data for the title detected by scanning a cover through scanning module 200. Whether the printshop equipment is to one extent or another "in-line" or "off-line," printer 220 outputs the book block to accumulator 230 (step 30), where the title associated with the book block is confirmed by reading a bar code or equivalent on an outside page of the book block (step 32), such as with a bar-code reader 232. If the title of the book block matches the title of the scanned cover output on ramp 206, the book block and cover are sent to book binder 240 for binding and other final manufacturing steps (step 20).

If no cover or book block is available in accumulator 230 at a given time (step 34), or the book block arriving in accumulator 230 is determined, by reading with reader 232, not to match the title of the cover arriving from ramp 206 (step 36), or, a controller (in one embodiment, associated with module 200) is declared and a human user alerted by causing an error message to be displayed through user interface 208 (step 38). The human user can then effect some sort of troubleshooting or manual correction (step 40).

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

What is claimed is:

1. A method of printing books based on digital data, comprising:
   receiving a plurality of orders, each order of the plurality of orders comprising at least one requested book;
   combining the plurality of orders to form a streamlined order, wherein:
      each requested book of the plurality of orders is grouped by a book title, of a plurality of book titles, associated with the requested book in the streamlined order; and
      each book title of the plurality of book titles is associated with one or more printing parameters, such that for each book title of the plurality of book titles, each requested book associated with the book title of the plurality of book titles is associated with the same one or more printing parameters;
   obtaining a plurality of covers to form a streamlined cover set corresponding to the streamlined order, wherein each cover of the plurality of covers is associated with one book title of the plurality of book titles;

scanning the streamlined cover set, wherein the scanning comprises detecting the one book title associated with each cover of the plurality of covers;

printing a book block corresponding to each cover of the plurality of covers, wherein:
  the book block is printed based on the one book title associated with the cover of the plurality of covers; and
  the printing comprises printing using the one or more printing parameters associated with the one book title associated with the cover of the plurality of covers;

sending each cover of the plurality of covers to an accumulator for attachment to the book block; and scanning a portion of the book block to determine an expected book title and comparing the expected book title with a book title associated with a cover received in the accumulator.

2. The method of claim 1, further comprising printing at least a subset of the plurality of covers based on the streamlined order.

3. The method of claim 1, wherein the streamlined order is organized as a print job for printing the streamlined cover set corresponding to the streamlined order.

4. The method of claim 1, further comprising declaring an error if the expected book title does not match the book title associated with the cover received in the accumulator.

5. An apparatus useful in book manufacture, comprising:
one or more printers;
one or more scanners;
a processing system comprising one or more processors; and
a memory system comprising one or more computer-readable media, wherein the one or more computer-readable media contain instructions that, when executed by the processing system, cause the processing system to perform operations comprising:
  receiving a plurality of orders, each order of the plurality of orders comprising at least one requested book;
  combining the plurality of orders to form a streamlined order, wherein:
    each requested book of the plurality of orders is grouped by a book title, of a plurality of book titles, associated with the requested book in the streamlined order; and
    each book title of the plurality of book titles is associated with one or more printing parameters, such that for each book title of the plurality of book titles, each requested book associated with the book title of the plurality of book titles is associated with the same one or more printing parameters;
  obtaining a plurality of covers to form a streamlined cover set corresponding to the streamlined order, wherein each cover of the plurality of covers is associated with one book title of the plurality of book titles;
  scanning the streamlined cover set, wherein the scanning comprises detecting the one book title associated with each cover of the plurality of covers; and
  printing a book block corresponding to each cover of the plurality of covers, wherein:
    the book block is printed based on the one book title associated with the cover of the plurality of covers;
    the printing comprises printing using the one or more printing parameters associated with the one book title associated with the cover of the plurality of covers;
  sending each cover of the plurality of covers to an accumulator for attachment to the book block; and
  scanning a portion of the book block to determine an expected book title and comparing the expected book title with a book title associated with a cover received in the accumulator.

6. The apparatus of claim 5, further comprising a user interface for displaying an error message if the book title does not match the expected book title.

* * * * *